US006833418B2

(12) United States Patent
Tan et al.

(10) Patent No.: US 6,833,418 B2
(45) Date of Patent: Dec. 21, 2004

(54) DISPERSIONS CONTAINING PERFLUOROVINYL ETHER HOMOPOLYMERS AND USE THEREOF

(75) Inventors: Lian S. Tan, Woodbury, MN (US); Richard S. Buckanin, Woodbury, MN (US); E. Steven McAlister, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 255 days.

(21) Appl. No.: 10/117,715

(22) Filed: Apr. 5, 2002

(65) Prior Publication Data

US 2003/0191258 A1 Oct. 9, 2003

(51) Int. Cl.[7] ............................................. C08F 116/12
(52) U.S. Cl. ..................... 526/247; 526/249; 526/250; 526/206; 524/805; 524/458
(58) Field of Search ................. 526/247, 249, 526/250, 206; 524/805, 458

(56) References Cited

U.S. PATENT DOCUMENTS

| | | | |
|---|---|---|---|
| 2,567,011 A | 9/1951 | Diesslin et al. | |
| 2,732,398 A | 1/1956 | Brice et al. | |
| 2,809,990 A | 10/1957 | Brown | |
| 3,132,124 A | 5/1964 | Couture et al. | |
| 3,136,745 A | 6/1964 | Albin et al. | |
| 3,450,684 A | 6/1969 | Darby | |
| 3,817,960 A | 6/1974 | Resnick | |
| 4,029,867 A | 6/1977 | Wasley et al. | |
| 4,035,565 A | 7/1977 | Apotheker et al. | |
| 4,316,836 A * | 2/1982 | Aufdermarsh, Jr. .......... | 524/90 |
| 4,368,308 A | 1/1983 | Yamabe et al. | |
| 4,391,940 A | 7/1983 | Kuhls et al. | |
| 4,418,186 A | 11/1983 | Yamabe et al. | |
| 4,546,157 A | 10/1985 | Nakagawa et al. | |
| 4,619,983 A | 10/1986 | Yamabe et al. | |
| 4,654,394 A | 3/1987 | Yamabe et al. | |
| 4,670,328 A | 6/1987 | Kawachi et al. | |
| 4,766,190 A | 8/1988 | Morita et al. | |
| 4,789,717 A | 12/1988 | Giannetti et al. | |
| 4,840,998 A | 6/1989 | Shimizu et al. | |
| 4,929,471 A | 5/1990 | Groelinger | |
| 5,110,385 A | 5/1992 | Birdwell et al. | |
| 5,608,022 A * | 3/1997 | Nakayama et al. .......... | 526/212 |
| 5,639,838 A | 6/1997 | Albano et al. | |
| 5,648,430 A * | 7/1997 | Chiodini et al. ............. | 525/415 |
| 5,696,216 A * | 12/1997 | Kruger et al. ............... | 526/247 |
| 5,891,974 A * | 4/1999 | Saito et al. .................. | 526/247 |
| 5,969,066 A | 10/1999 | Enokida et al. | |
| 6,677,414 B2 * | 1/2004 | Hintzer et al. ............... | 526/206 |
| 2003/0139521 A1 * | 7/2003 | Linert et al. ................. | 524/507 |

FOREIGN PATENT DOCUMENTS

| | | |
|---|---|---|
| CA | 2313886 | 1/2001 |
| DE | 1 720 799 | 3/1970 |
| DE | 199 32 771 A 1 | 1/2001 |
| EP | 0185241 A2 * | 6/1986 |
| EP | 0 186 186 B1 | 7/1991 |
| EP | 0 219 065 B1 | 3/1992 |
| EP | 0 566 974 B1 | 9/1995 |
| EP | 0 524 585 B1 | 3/1997 |
| EP | 0 632 009 B1 | 7/1997 |
| EP | 0 731 081 B1 | 4/1998 |
| EP | 0 969 055 A1 | 1/2000 |
| EP | 1 160 258 A1 | 12/2001 |
| GB | 1196760 | 7/1970 |
| JP | 2729838 | 3/1998 |
| WO | WO 99/62830 | 12/1999 |
| WO | WO 99/62858 | 12/1999 |
| WO | WO 00/52060 | 8/2000 |
| WO | WO 01/06054 A1 | 1/2001 |

OTHER PUBLICATIONS

U.S. patent application Ser. No. 09/861,782, filed May 21, 2001, "Polymers Containing Perfluorovinyl Eithers and Applications for Such Polymers".

\* cited by examiner

Primary Examiner—David W. Wu
Assistant Examiner—Henry S. Hu
(74) Attorney, Agent, or Firm—Kent S. Kokko

(57) ABSTRACT

The present invention provides a method of preparing an aqueous dispersion of poly(perfluorovinyl ether) homopolymers. The present invention further relates to a method of making an aqueous fluoropolymer dispersion comprising bicomponent particles of poly(perfluorovinyl ether)homopolymers and a second fluoropolymer. The dispersions of the present invention may be used for rendering fibrous substrates oil repellent, water repellent and/or stain repellent.

21 Claims, No Drawings

DISPERSIONS CONTAINING PERFLUOROVINYL ETHER HOMOPOLYMERS AND USE THEREOF

FIELD OF THE INVENTION

The present invention relates to a method of preparing an aqueous dispersion of poly(perfluorovinyl ether) homopolymers. The present invention further relates to a method of making an aqueous fluoropolymer dispersion comprising bicomponent particles of poly(perfluorovinyl ether)homopolymers and a second fluoropolymer. The dispersions of the present invention may be used for rendering fibrous substrates oil repellent, water repellent and/or stain repellent. The invention further relates to fibrous substrates, in particular textiles, treated with the fluorochemical composition and to a method of treating the fibrous substrate with the fluorochemical dispersions.

BACKGROUND

Compositions for making substrates, in particular fibrous substrates, such as textiles, oil- and water repellent have been long known in the art. When treating fibrous substrates and in particular textile such as apparel, it is a requirement that the textile retains its look and feel as much as possible. Therefore, the amount of composition that can be applied in any treatment to provide repellency properties to the substrates is limited because large amounts would result in disturbing the look and feel of the substrate and would make them useless for many applications. As a result, the composition used for treating the substrates need to be effective at low application levels.

Fluorochemical compounds have been well known as being highly effective in providing oil and water repellency to substrates and in particular textile substrates. The commercially available fluorochemical compositions can be applied at low levels and are generally effective in providing the desired oil and water repellency properties at these low levels.

Fluorochemicals taught for treating textile include polymers based on vinyl ethers that have a perfluoroalkyl group. For example, U.S. Pat. No. 4,929,471 discloses the use of a copolymer of $CH_2$=CH—OR wherein R may represent a fluorinated group for treating polyester fabric during its manufacturing process so as to produce a polyester fabric that has similar physical properties as silk or rayon.

U.S. Pat. No. 4,029,867 discloses to provide soil repellency and soil release properties to textile using a copolymer of maleic anhydride and a comonomer of the formula $CH_2$=CH—$CH_2$—O—$R_f$ wherein $R_f$ represents a perfluorinated group. A homopolymer of $CH_2$=CH—O—$R_f$ is disclosed in DE 1720799 and is mentioned to be suitable for rendering textile oil and water repellent. The aforementioned fluorochemical compositions are all based on fluorine containing polymers that do not have a fluorinated backbone.

Fluoropolymers having a fluorinated backbone such as for example polytetrafluoroethylene (PTFE) and copolymers of tetrafluoroethylene (TFE), have been known for coating substrates to provide various properties to the substrate including repellency properties. Fluoropolymers have for example been coated on cookware to provide desired release properties thereto. Fluoropolymers having a fluorinated backbone are disclosed in U.S. Pat. Nos. 4,546,157, 4,619,983, 4,766,190, 5,110,385, 5,969,066, 3,450,684, 4,035,565, 4,368,308, 4,418,186, 4,654,394, 4,840,998, 5,639,838 and 3,136,745. However, to be effective as a repellent coating, it has been taught to apply fluoropolymer coatings in high amounts. Such thick coatings are however unsuitable for treating textiles as they change the look and feel of the textile substrate substantially, i.e. to the extent such textiles are unsuitable for use in apparel. Sometimes, such coatings are subsequently subjected to a sintering step at high temperatures that would generally destroy many of the fibrous substrates desired for treatment.

EP 969 055 for example discloses an aqueous dispersion containing PTFE and a copolymer of TFE and a perfluorovinyl ether (PVE) for coating substrates such as ceramics or to impregnate textile. However, the amount of fluoropolymer in the treatment solution is at least 25% by weight resulting in a fairly thick coating. Moreover, the coating is subjected to a sintering step at a temperature of 420° C. which would destroy many fibrous materials used for apparel.

U.S. Pat. No. 4,670,328 discloses aqueous dispersions of certain copolymers of TFE and PVE for the impregnation of textiles. Again, the level of fluoropolymer applied in the impregnation is so large that the look and feel of the textile is substantially affected. Accordingly, the impregnated materials are generally only useful in specialized applications such as dust free clothes or chemical resistant clothes where the appearance of the clothes is of secondary consideration.

EP 186186 discloses a curable fluoroolefin polymer for making coatings that have high weatherability and good repellency properties such as water repellency, oil repellency and/or stain repellency. However, a thick coating is apparently required to achieve these properties.

Fluorochemical compositions for rendering fibrous substrates oil- and/or water repellent are described in Applicant's co-pending application U.S. Ser. No. 09/861,782 filed May 21, 2001. The compositions comprise up to 4% by weight of a fluoropolymer having a fully- or partially fluorinated backbone and comprise repeating units of the formula —$CF_2$—$CFR_f$—, where $R_f$ is a perfluorinated organic group having a chain length of at least two atoms and having at least one carbon atom.

Although perfluorovinyl ether homopolymers have been prepared, and copolymers of perfluorovinyl ethers have been used in textile treatments, the difficulty in preparing perfluorovinyl ether homopolymers have heretofore prohibited their use in textile treatments. It would thus be desirable to find alternative fluorochemical compositions that do not display many of the disadvantages of the fluorochemical compositions in the prior art. In particular, it would be desirable to find fluorochemical compositions comprising perfluorovinyl ether homopolymers that are effective in providing oil and water repellency to a fibrous substrate, in particular a textile substrate, without substantially adversely affecting the appearance of the textile, i.e. such that the fibrous substrate is suitable for use in apparel. Preferably, the fluorochemical compositions are also capable of providing soil repellency and soil release properties to the fibrous substrate. Desirably, the fluorochemical compositions will be more environmental friendly and sufficiently stable to substantially avoid formation of low molecular weight fluorinated substances. The fluorochemical compositions are preferably also compatible with commonly used textile treatments and are preferably easy to apply by a customer in a reproducible and reliable way. Finally, the desired fluorochemical compositions are preferably capable of providing durable repellency properties to a fibrous substrate.

SUMMARY OF THE INVENTION

The present invention provides a method of making a poly(perfluorovinyl ether) homopolymer dispersion comprising the steps of:

a) pre-emulsifying an aqueous mixture of a perfluorovinyl ether in the presence of a fluorochemical emulsifier to an average emulsion droplet size of 1 micron or less, and b) polymerizing said perfluorovinyl ether in the presence of a free-radical initiator at temperature and for a time sufficient to produce particles of poly(perfluorovinyl ether).

The perfluorovinyl ether used in the present invention of claim 1 are of the formula: $CF_2=CF-R_f$, wherein $R_f$ represents a perfluorinated organic group having a chain length of at least 2 atoms and having at least one carbon atom and at least one oxygen atom. The $R_f$ group may be a perfluoroalkoxy group, a perfluoroether group or a perfluoropolyether group.

The present invention further provides a method of making a fluoropolymer dispersion comprising bicomponent particles comprising the steps of:

a. pre-emulsifying an aqueous mixture of a perfluorovinyl ether monomer in the presence of a fluorochemical emulsifier to an average emulsion droplet size of one micron or less, and b. polymerizing said perfluorovinyl ether in the presence of a free-radical initiator at temperature and for a time sufficient to produce particles of poly(perfluorovinyl ether), c) subsequently adding at least one additional fluorinated co-monomer without additional fluorochemical emulsifier, and d) further polymerizing the resulting mixture.

As used herein a "bicomponent particle" is a single particle of two distinct fluoropolymers. The first fluoropolymer is a homopolymer of one or more perfluorovinyl ether monomers. The second fluoropolymer may be any fluoropolymer comprising one or more fluoromonomers, such as tetrafluoroethylene homo- or copolymers, vinylidene fluoride homo- or copolymers, or hexafluoropropylene homo- or copolymers or perfluorovinyl ether homo- or copolymers. The bicomponent particle may comprise a core-shell, inverted core-shell, half-moon, or other morphologies.

In a further aspect, the present invention provides a fluoropolymer dispersion for rendering a fibrous substrate oil and/or water repellent. The fluorochemical dispersion may comprise particles of poly(perfluorovinyl ether) homopolymer or may comprise bicomponent particles of poly(perfluorovinyl ether) homopolymer and a second component fluoropolymer.

In a still further aspect, the invention relates to a fluoropolymer dispersion that comprises a bicomponent particle comprising a first poly(perfluorovinyl ether) and a second fluoropolymer. The first fluoropolymer consists essentially of repeating units corresponding to the general formula:

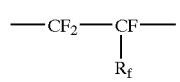

(I)

wherein $R_f$ represents a perfluorinated organic group having a chain length of at least 1 oxygen atom and having at least one carbon atom.

Such dispersions of bicomponent particles have been found to be particularly effective for the treatment of fibrous substrates. In particular it was found that the second fluoropolymer contributed to an improvement of the repellency properties often going beyond a mere addition of the oil repellency properties of the fluoropolymers on their own, particularly with an auxiliary component as described below. Accordingly, the cost of a fluorochemical treatment composition may thereby be lowered as the cost of the first poly(perfluorovinyl ether)homopolymer is generally higher than that of the second fluoropolymer.

The fluoropolymer dispersion of the present invention has been found to be effective for providing oil repellency and/or water repellency properties to a fibrous substrate without substantially affecting the appearance thereof. Furthermore, the fluoropolymer dispersion may be produced such that the amount of low molecular weight species (less than 1000 g/mol) in the composition is low, e.g. not more than 0.5% by weight, preferably not more than 1000 ppm, or is even free of such substances. Also, the fluoropolymer dispersions generally will have a high chemical stability such that the fluoropolymer dispersions generally do not form low molecular weight fluorinated substances over a long period of time. The fluoropolymer dispersion may further provide soil repellency as well as soil or stain release properties. With the term soil and stain release is meant that a treated substrate that becomes soiled or stained can be more easily cleaned in for example a home laundering than an untreated substrate that becomes soiled or stained. Soil/stain repellency on the other hand refers to the ability to repel soil thereby reducing soiling or staining of the substrate.

The amount of the fluoropolymer in a treatment composition will typically be selected in order to achieve the desired level of fluoropolymer on the substrate to be treated. Typically the amount of the fluoropolymer in the treatment composition is not more than 4% by weight (based on the total weight of the composition), for example between 0.01% by weight and 4% by weight, preferably between 0.05% and 3% by weight. Higher amounts of the fluoropolymer can be used as well, particularly in cases where the uptake of the composition by the fibrous substrate is low.

In a further aspect, the present invention relates to a treatment of fibrous substrates with the above fluorochemical compositions. The substrates so obtained generally have good repellency properties such as oil repellency, water repellency, soil repellency. Additionally, the treated substrates may exhibit good or improved soil/stain release properties as well.

In a still further aspect of the present invention there are provided fibrous substrates, in particular textiles, that have coated on at least part of at least one major surface, the fluoropolymer dispersion of the invention. The amount of the fluoropolymer on such a treated fibrous substrate should generally be less than 3% by weight based on the weight of the fibrous substrate so as to preserve the general look and feel of the substrate although the amount that can be applied without adversely affecting the look and feel of the substrate will depend on the nature of both the substrate as well as the fluorochemical composition used in the treatment.

In yet another aspect, the invention relates to the use of a fluoropolymer dispersion to impart oil repellency, water repellency, soil repellency and/or soil/stain release to a fibrous substrate without substantially affecting the look and feel of said fibrous substrate, the fluorochemical composition comprising a solution or dispersion of a fluoropolymer having fully fluorinated backbone and comprising one or more repeating units corresponding to the general formula:

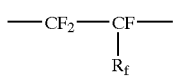
(I)

wherein $R_f$ represents a perfluorinated organic group having a chain length of at least 1 oxygen atom and having at least one carbon atom. By the term "without substantially affecting the look and feel of said fibrous substrate" is meant that the treated substrate does not differ substantially in appearance from the untreated substrate such that the treated substrate can be used without objection in applications such as for example apparel, where the look and feel of the fibrous substrate are a major consideration for its use.

Finally, the invention relates to fluorochemical compositions that comprise a dispersion of the aforementioned fluoropolymer(s) and further an auxiliary component, generally a non-fluorinated organic compound, that is capable of further improving the water and/or oil repellency and/or the soil/stain release properties of a fibrous substrate treated with the fluorochemical composition.

DETAILED DESCRIPTION OF ILLUSTRATIVE EMBODIMENTS OF THE INVENTION

Fluoropolymers for Use in the Fluorochemical Composition

The poly(perfluorovinyl ethers) for use in the fluorochemical composition are polymers that have a fully fluorinated backbone. The term "fully fluorinated" includes polymers in which all hydrogen atoms on the backbone have been replaced by fluorine as well as polymers in which all hydrogen atoms on the backbone have been replaced with fluorine and chlorine or bromine.

The fluoropolymer has one or more repeating units that correspond to the general formula:

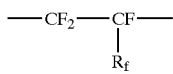
(I)

wherein $R_f$ represents a perfluorinated (i.e. all hydrogen atoms have been replaced by fluorine atoms) organic group having a chain length of at least 1 oxygen atom and including at least one carbon atom. Preferably the chain length of the perfluorinated organic group is at least 3 atoms. A particularly preferred $R_f$ group has a chain length of at least 4 atoms of which at least 3 are carbon atoms.

Examples of $R_f$ groups include perfluorinated aliphatic groups that contain one or more oxygen atoms. The $R_f$ group may in particular be a linear or branched perfluoralkoxy group, preferably, the perfluoroalkoxy group will have between 1 and 6 carbon atoms and specific examples include perfluorinated methoxy, ethoxy and n-propoxy groups. Still further, the $R_f$ group can be a perfluoropolyether which may be linear or branched. According to a preferred embodiment, the $R_f$ group corresponds to the following general formula:

$$-O(R^1{}_fO)_n(R^2{}_fO)_mR^3{}_f$$ (II)

wherein $R^1{}_f$, $R^2{}_f$ each independently represents a linear or branched perfluoroalkylene group having 1, 2, 3, 4, 5 or 6 carbon atoms, $R^3{}_f$ represents a linear, branched or cyclic perfluoroalkyl group having 1, 2, 3, 4, 5 or 6 carbon atoms and n and m each independently represents an integer of 0 to 10. Preferably, at least one of n and m is different from 0. Particularly preferred $R_f$ groups according to formula (II) include those in which m is 0, n is 1, $R^1{}_f$ is —$CF_2CF_2$—, —$CF_2CF(CF_3)$—, —$CF(CF_3)CF_2$— or —$CF_2CF_2CF_2$— and $R^3{}_f$ represents a linear, branched or cyclic perfluoroalkyl group having 1 to 6 carbon atoms. A preferred $R_f$ groups according to formula (II) includes in particular a perfluoropropyl group and those in which both m and n are 0. Another preferred $R_f$ group according to formula (II) includes in particular a perfluoropropyl group and those in which the sum of m and n is 1.

It will be understood by one skilled in the art that the fluoropolymer of the fluorochemical composition may comprise a mixture of repeating units according to formula (I). For example, the fluoropolymer may comprise a mixture of repeating units in which the $R_f$ groups correspond to formula (II) above such as for example a mixture of a repeating unit corresponding the formula:

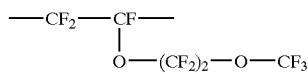

and a repeating unit corresponding to the formula:

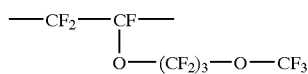

or a mixture of repeating units derived from a combination of perfluoro(propyl vinyl) ether and a monomer of the formula $CF_2$=$CF$—$O$—$CF_2CF(CF_3)$—$O$—$CF_2CF_2CF_3$.

The repellency properties that can be achieved by the fluorochemical composition largely depend on the presence in the fluoropolymer of perfluorovinyl ether repeating units according to formula (I). A fluoropolymer containing only repeating units according to general formula (I) has been found to yield excellent repellency properties on a fibrous substrate treated therewith. Although higher amounts of the repeating units of formula (I) will generally improve performance, the cost of the fluoropolymer thereby also increases as well because the monomers from which these repeating units are derived are generally expensive.

In a particular embodiment of the present invention, the fluorochemical composition comprises a fluoropolymer dispersion comprising bicomponent particles of a first poly(perfluorovinyl ether)homopolymer and second fluoropolymer each having a fully- or partially fluorinated backbone. It is believed that the bicomponent particles are a core-shell polymer comprising a core of poly(perfluorovinyl ether) homopolymer and a shell of a second fluoropolymer.

The first fluoropolymer consists essentially of one or more repeating units corresponding to the general formula (I) set forth above. Generally the second fluoropolymer contains the repeating units of formula (I) in a total amount of not more than 50 mole %. The amount of repeating units in the second fluoropolymer may even be less, for example not more than 25 mole % or not more than 10 mole %. Further, even if less than 1 mole % or substantially no repeating units are present in the second polymer, beneficial effects of the second polymer have been noticed. In particular, it was noticed that although the second fluoropolymer generally does not (e.g. if it does not contain the repeating units of formula (I)) or only to a limited extent provides repellency properties when used on its own, the second fluoropolymer is nevertheless capable of improving the repellency performance when used in a dispersion of bicomponent particles with the first fluoropolymer.

Generally, any ratio of first to second fluoropolymers can be used to prepare the emulsion and the optimal ratio will depend on the nature of the fluoropolymers used in the mixture, the nature of the fibrous substrate, amount of the mixture applied and level of repellency desired. The optimal ratio can easily be determined through routine experimentation. Generally, the weight percent of the first fluoropolymer will be between 1 to 50 wt. %, preferably between 1 to 30 wt. %, with the second fluoropolymer providing the balance. Thus, mixtures that are rich in the second fluoropolymer (have a weight percent of second fluoropolymer of 50% or more), which contains no or little of the repeating units of formula (I), have been found to yield good repellency properties. Generally however, the total amount of repeating units according to the general formula (I) in such mixtures should be at least 10 wt. %, preferably at least 20 wt. % to achieve good levels of repellency.

The bicomponent or core-shell particle dispersion may be prepared by the steps of:

1) polymerizing an aqueous emulsion of monomers of the formula:

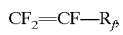

wherein $R_f$ represents a perfluorinated organic group having a chain length of at least 2 atoms and having at least one carbon atom and one oxygen atom;
  in the presence of a free radical initiator and a emulsifier at temperature and for a time sufficient to produce particles of poly(perfluorovinyl ether), 2) subsequently adding at least one additional fluorinated co-monomer without additional fluorochemical emulsifier, and 3) further polymerizing the resulting mixture.

Preferably, the emulsion of step 1) comprises droplets having an average droplet size of less than 1 micron, preferably 300 nanometers.

An important benefit of the use of a fluoropolymer mixture is that the total cost of the treating composition can be reduced while still achieving a high level of performance, as the cost of perfluorovinyl ether monomers considerably exceeds that of other monomers that may be used in the second stage of the polymerization process.

The second fluoropolymer component of the bicomponent particle comprises a homo- or copolymer of at least one ethylenically-unsaturated fluoromonomer containing at least one fluorine atom substituent on a double-bonded carbon atom, and further substituted with a halogen atom such as fluorine, chlorine, or bromine; hydrogen, or a lower fluoroalkyl radical.

Useful fluorinated comonomers of the second component fluoropolymer include homo- and copolymers of tetrafluoroethylene, vinylidene fluoride, hexafluoropropene, chlorotrifluoroethylene, 2-chloropentafluoropropene, 1-hydropentafluoropropene, dichlorodifluoroethylene, trifluoroethylene, 1,1-chlorofluoroethylene, trichloroethylene, and the like and optionally a monomer corresponding to formula (1) above.

Generally, the fluoropolymer will contain between 0 and 70 mole %, preferably between 0 and 60 mole %, more preferably between 0 and 40 mole % of repeating units derived from tetrafluoroethylene, between 0 and 95 mole %, preferably between 20 and 80 mole %, more preferably between 30 and 75 mole % of repeating units derived from vinylidene fluoride, between 0 and 95 mole %, preferably between 20 and 80 mole %, more preferably between 30 and 75 mole % of repeating units derived from hexafluoropropene, whereby the total amount of repeating units derived from vinylidene fluoride, hexafluoropropene and tetrafluoroethylene is generally between 0 and 95 mole %, preferably between 20 and 90 mole %, more preferably between 30 and 90 mole %.

The second component fluoropolymer of the fluorochemical composition contain further repeating units derived from non-fluorinated monomers. Examples of non-fluorinated monomers include alpha-olefin hydrocarbons such as ethylene and propylene. The amount of such further repeating units may vary widely and can be from 0 mole % to 50 mole % for any particular non-fluorinated monomer.

Specific examples of second component fluoropolymers that can be used in the fluorochemical composition of this invention are copolymers of tetrafluoroethylene and a perfluorovinyl ether such as perfluoro(methyl vinyl)ether, perfluoro(methoxyethyl vinyl)ether, perfluoro (propyl vinyl) ether (PPVE-1), perfluoro (2-(n-propoxy)propyl vinyl)ether (PPVE-2) and perfluoro(ethoxyethyl vinyl)ether, copolymers of tetrafluoroethylene, hexafluoropropylene and a perfluorovinyl ether such perfluoro(methyl vinyl)ether, perfluoro(methoxyethyl vinyl)ether, PPVE-1, PPVE-2 and perfluoro(ethoxyethyl vinyl)ether, copolymers of vinylidene fluoride and a perfluorovinyl ether such as perfluoro(methyl vinyl)ether, PPVE-1, PPVE-2, perfluoro(methoxyethyl vinyl)ether and perfluoro(ethoxyethyl vinyl)ether, copolymers of vinylidene fluoride, tetrafluoroethylene and a perfluorovinyl ether such as perfluoro(methyl vinyl)ether. perfluoro(methoxyethyl vinyl)ether, PPVE-1, PPVE-2, and perfluoro(ethoxyethyl vinyl)ether, copolymers of vinylidene fluoride, hexafluoropropylene and a perfluorovinyl ether such as perfluoro(methyl vinyl)ether, PPVE-1, PPVE-2, perfluoro(methoxyethyl vinyl) ether and perfluoro (ethoxyethyl vinyl)ether and copolymers of vinylidene fluoride, tetrafluoroethylene, hexafluoropropylene and a perfluorovinyl ether such as perfluoro(methyl vinyl)ether, PPVE-1, PPVE-2, perfluoro(methoxyethyl vinyl)ether and perfluoro(ethoxyethyl vinyl)ether.

Method of Making the Fluoropolymers

The poly(perfluorovinyl ether)homopolymer particles are produced through aqueous emulsion polymerization of a pre-emulsion comprising the perfluorovinyl ether monomer and fluorinated emulsifier wherein the average droplet size of the pre-emulsion is one micron or less, preferably 300 nanometers or less. In the aqueous emulsion polymerization, the monomers are polymerized in the aqueous phase in the presence of a free radical initiator and a fluorinated emulsifier, preferably a non-telogenic emulsifier.

Generally the time required for the homopolymerization is 6 to about 48 hours and the temperatures ranges from 40 to 80° C., preferably 40 to 60° C. Higher temperatures may lead to destabilization of the droplets.

The fluorochemical emulsifier will generally be used in amounts less than 1% by weight, for example from 0.1 to 1% by weight based on the weight of the aqueous phase. Examples of fluorinated emulsifiers include salts, in particular ammonium salts of linear or branched perfluoro alkyl containing carboxylic and sulphonic acids having 4 to 11 carbon atoms in the alkyl chain. Specific examples include perfluorooctanoic acid ammonium salt (APFO, described in U.S. Pat. No. 2,567,011) $C_8F_{17}SO_3Li$ which is commercially available from Bayer AG, $C_4F_9SO_3Li$ and $C_4F_9SO_3K$ (described in U.S. Pat. No. 2,732,398). A further example of a perfluoroalkyl containing carboxylic acid salt is $C_8F_{17}SO_2N(C_2H_5)CH_2COOK$ (described in U.S. Pat. No. 2,809,990). Still further emulsifiers that can be used include perfluoropolyethercarboxylate emulsifiers such as disclosed in EP 219065

In accordance with an embodiment of the present invention, the emulsion polymerization may be conducted using a fluorinated emulsifier having a molecular weight of at least 200 g/mol, preferably at least 1000 g/mol for example by using a polymeric fluorinated emulsifier. Examples of suitable fluorinated polymeric or high molecular weight emulsifiers include perfluoropolyethers having one or more hydrophilic groups, in particular ionic groups such as carboxylic acid groups or salts thereof. Examples of perfluoropolyether emulsifier include those according to the following formulas (IV) or (V):

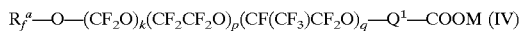

$$R_f^a\text{—O—}(CF_2O)_k(CF_2CF_2O)_p(CF(CF_3)CF_2O)_q\text{—}Q^1\text{—COOM} \quad (IV)$$

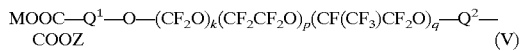

$$\text{MOOC—}Q^1\text{—O—}(CF_2O)_k(CF_2CF_2O)_p(CF(CF_3)CF_2O)_q\text{—}Q^2\text{—COOZ} \quad (V)$$

wherein k, p and q each represent a value of 0 to 15, typically 0 to 10 or 12 and the sum of k, p and q being such that the average molecular weight is at least 200 g/mol, preferably at least 100 g/mol, $R_f^a$ represents a perfluoroalkyl group of 2 to 4 carbon atoms, M and Z each independently represent hydrogen or a cation, preferably a monovalent cation such as ammonium or an alkali metal ion and $Q^1$ and $Q^2$ each independently represents —$CF_2$— or —$CF(CF_3)$—.

Examples of fluorinated compounds useful as emulsifiers of formula (IV) include those corresponding to the general formula:

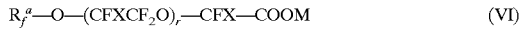

$$R_f^a\text{—O—}(CFXCF_2O)_r\text{—CFX—COOM} \quad (VI)$$

wherein $R_f^a$ and M have the meaning as defined in formula (IV), X is a hydrogen atom or a fluorine atom and r has a value of 2 to 15. Examples of such fluorinated emulsifiers are disclosed in EP 219065. Commercially available fluorinated compounds according to formula (IV) or (V) include FLUOROLINK™ C available from Ausimont SpA, KRYTOX™ 157 FSL, KRYTOX™ 157 FSM and KRYTOX™ 157 FSH, all available from E.I. Dupont de Nemours and Company.

Still further fluorinated polymeric compounds useful as emulsifiers include the perfluoropolymers that comprise repeating units derivable from a monomer of the formula:

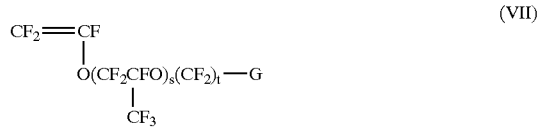

$$\begin{array}{c} CF_2\!\!=\!\!CF \\ | \\ O(CF_2CFO)_s(CF_2)_t\text{—G} \\ | \\ CF_3 \end{array} \quad (VII)$$

wherein s is 0, 1 or 2, and t is an integer of 2 to 4, and G is a moiety containing one or more hydrophilic groups, such as a nonionic, anionic or cationic group. Examples of suitable nonionic groups include: —$SO_2F$; hydroxyalkylene, e.g., —$(CH_2)_n OH$ where n is an integer of 1 to 18; hydroxyarylene; and an ester, e.g., —COOR, wherein R is an alkyl group of 1 to 3 carbon atoms. Examples of suitable anionic groups include: carboxyl groups, e.g., —$CO_2M$ where M may be hydrogen, a mono or divalent metal ion (e.g., sodium, potassium or magnesium), ammonium (e.g., simple ammonium, tetraalkylammonium, tetraarylammonium) or phosphonium (e.g., tetraalkylphosphonium); or sulfonate groups, e.g., —$SO_3M$, where M is defined as above. Examples of suitable cationic groups include alkylammonium groups, (e.g., —$(CH_2)_n NR_3^+ Cl^-$ where R may be hydrogen, alkyl or aryl).

Preferably, the fluorinated polymeric emulsifier is a copolymer of tetrafluoroethylene and a monomer according to formula (VII). Such copolymers and their method of making are disclosed in for example U.S. Pat. No. 5,608,022 and WO 00/52060. Suitable fluorinated polymeric compounds useful as emulsifiers are available as Nafion™ superacid catalysts (e.g., Nafion™ SE10172) from E. I duPont de Nemours & Co., Wilmington, Del. and are also available as Flemion™ superacid polymers from Asahi Chemical Co., Osaka, Japan and as Acipex™ superacid polymers from Asahi Glass Co., Tokyo, Japan.

If desired, several methods may be used to recover and recycle the fluorinated emulsifiers used in the aqueous emulsion polymerization. Such methods are disclosed in e.g. EP 524585, EP 566974, EP 632009, EP 731081, WO 99/62858, WO 99/62830 and DE 19932771. Any of these methods may advantageously be practiced in this invention to remove and or minimize any remaining fluorinated emulsifier subsequent to the emulsion polymerization.

According to a particular embodiment for making the fluoropolymer dispersions, the liquid perfluorovinyl ether monomer used in the polymerization is pre-emulsified prior to its homopolymerization. The present method allows the preparation of perfluorovinyl ether homopolymers much more efficiently than the processes of the prior art. By the term "pre-emulsified" in connection with the present invention is meant that the fluorinated monomer is emulsified in water to a droplet size of one micron or less, preferably 300 nm or less, with the aid of the fluorinated emulsifier prior to polymerization of the liquid fluorinated monomer. The temperature of the polymerization to prepare an emulsion of perfluorovinyl ether homopolymer is generally between 40 and 100° C., preferably between 50 and 80° C.

The perfluorovinyl ether monomer can be emulsified in water with the aid of a fluorinated emulsifier such as described above, prior to its polymerization with the other monomers. The pre-emulsification of the liquid fluorinated monomer results in an emulsion having monomer droplets. The pre-emulsion average droplet size can range from an average diameter of 1 μm or less, down to about 150 nm or even lower. Preferably the average droplet diameter is not more than 300 nm. The aqueous emulsion should preferably have a pot life (settling time) of at least 1 hour, more preferably at least 3 hours. The pot life or settling time is defined as the time required for 10% by weight of the monomer droplets to settle or separate out of the aqueous emulsion. Droplet size may be determined, for exampled, by light scattering experiments as are known in the art.

Aqueous emulsions of the perfluorovinyl ether monomer can conveniently be obtained by suitable emulsification equipment such as for example high speed rotor-stator mixers such as an Ultra-Turrax (Ika). The stirring rates should be sufficiently high to achieve the desired degree of emulsification and stability. Generally, stirring rates of 24 000 rpm or more can be employed. Air is preferably excluded during the emulsification. The pre-emulsion particle size can be further reduced with high pressure homogenizers, available from APV Gaulin or Microfluidics.

The amount of fluorinated emulsifier used to emulsify liquid fluorinated monomer is generally between 0.01 and 15% by weight based on the weight of the liquid fluorinated monomer, preferably 0.1 to 4% by weight. Although higher amounts of emulsifier can be used, they will not necessarily lead to a significant increased pot life of the aqueous emulsion of liquid fluorinated monomer produced. In the two-step process for making the bicomponent particle emulsion, lesser amounts my be used.

In the two-stage process of the invention, where a dispersion of bicomponent particles are prepared, the pre-emulsion is first polymerised to a degree of conversion of at least 1%, preferably at least 5%, as described, to produce a dispersion of perfluorovinyl ether homopolymer particles and unconverted perfluorovinyl ether monomer (if any). Additional fluorinated monomers are added with continuous agitation while the second stage of polymerization proceeds. The second stage of polymerization should occur without additional fluorinated emulsifier. In the absence of additional emulsifier, a bi-component particle dispersion is produced and the additional charge of fluorinated monomers are polymerized on the surface of the perfluorovinyl ether homopolymer particles. Were additional fluorinated emulsifier to be added, a mixture of discreet particles would be produced; a first particle of perfluorovinyl ether homopolymer and a second particle of fluoropolymer derived from the additional fluorinated monomer feed at the second stage of polymerization.

In the two-stage polymerization process (to produce the bicomponent dispersion) the polymerization may be initiated at a first temperature for the first stage of polymerization and at a second temperature for the second stage of polymerization. The initial period will typically be between 1 and 6 hours, for example between 1 and 4 hours from the start of the polymerization reaction. If desired, further initiator may be added during the polymerization but this may not be required. Amounts of initiator in the initial charge are generally between 0.01 and 2.0% by weight, preferably between 0.1 and 1.8% by weight, more preferably between 0.3% and 1.6% by weight based on the total weight of polymer to be produced. The temperature for use at the initial stage (when a higher temperature is used) is generally between 40° C. and 100° C., preferably between 50° C. and 80° C. The temperature during the course of polymerization is generally in the range of 30° C. to 80° C. The optimal conditions can be readily determined by routine experimentation.

Actinic radiation may be used, instead of free radical initiators, to initiate the polymerization. When actinic radiation, such as UV, is used to initiate the polymerization, lower temperatures from about 0° C. to ambient may used.

The aqueous emulsion polymerization of the perfluorovinyl ether can be carried out continuously in which, for example, a pre-emulsion of perfluorovinyl ether monomers, water, fluorochemical emulsifiers, buffers and initiators are fed continuously to a stirred reactor under optimum pressure and temperature conditions while the resulting dispersion or suspension is removed continuously. An alternative technique is batch or semibatch (semi-continuous) polymerization by feeding a pre-emulsion of the ingredients into a stirred reactor and allowing them to react at a set temperature for a specified length of time until a desired amount of polymer is formed.

In the second stage of the polymerization, the dispersion of poly(perfluorovinyl ether) is provided with the additional fluoromonomers in a continuous or batch mode.

The polymerization can be carried out in a standard or conventional vessel used for emulsion polymerization, but a pressure vessel is generally required for the second stage where gaseous fluorinated monomers are charged.

For the free-radical polymerization use may be made of any suitable initiator or any suitable initiator system, for example ammonium persulfate (APS), or of redox systems, such as APS/bisulfite, potassium permanganate or actinic radiation such as UV light. If oil-soluble initiators are used in the polymerization, it is generally preferred for these to be mixed with the aqueous emulsion of the perfluorovinyl ether monomer. For the purposes of the present invention, oil-soluble initiators are those which have no, or only insufficient, solubility in water. Examples of oil-soluble initiators are substituted dibenzoyl peroxides and cumene hydroperoxides, in particular bisperfluoropropionyl peroxide. For the first stage of the polymerization, persulfates are preferred.

Water-soluble thermal initiators useful in the present invention are initiators that, on exposure to heat, generate free-radicals which initiate polymerization of the monomers comprising the droplets of the emulsion. Suitable water-soluble thermal initiators include but are not limited to those selected from the group consisting of potassium persulfate, ammonium persulfate, sodium persulfate, and mixtures thereof; and oxidation-reduction initiators such as the reaction product of the above-mentioned persulfates and reducing agents such as those selected from the group consisting of sodium metabisulfite and sodium bisulfite. The preferred water-soluble thermal initiator is ammonium persulfate. Preferably, most water-soluble thermal initiators are used at temperatures of from about 50° C. to about 70° C., while the oxidation-reduction-type initiators are preferably used at temperatures of from about 25° to about 50° C. Water-soluble thermal initiators comprise from about 0.01 to about 2 weight percent, preferably about 0.1 to about 2 weight percent based on the total weight of monomers in the emulsion.

The amount of oxidizing agent added in the initial charge is typically between 10 and 10000 ppm. The amount of reducing agent in the initial charge is typically also between 10 and 10000 ppm. At least one further charge of oxidizing agent and reducing agent is added to the polymerization system in the course of the polymerization. The further addition(s) may be done batchwise or the further addition may be continuous.

The resultant fluoropolymer particles may be used as a dispersion per se. The particles may also be isolated from the aqueous medium by filtration, coagulation spray drying, extraction into an organic solvent, or other other techniques such as are known in the art.

The polymerization systems may comprise auxiliaries, such as buffers and, if desired, complex-formers or chain-transfer agents.

Fluorochemical Compositions

The fluorochemical composition comprises an aqueous dispersion of the fluoropolymer (whether perfluorovinyl ether homopolymer particles or the bicomponent particles). Generally, the amount of fluoropolymer contained in the treating composition is between 0.01 and 4% by weight, preferably between 0.05 and 3% by weight based on the total weight of the fluorochemical composition. Higher amounts of fluoropolymer of more than 4% by weight, for example up to 10% by weight may be used as well, particularly if the uptake of the fluorochemical composition by the substrate is low. Generally, the fluorochemical treating composition will be prepared by diluting a more concentrated fluorochemical composition to the desired level of fluoropolymer in the treating composition. The concentrated fluorochemical composition can contain the fluoropolymer in an amount of up to 70% by weight, typically between 10% by weight and 50% by weight.

When the fluorochemical composition is in the form of a dispersion in water the volume average particle size of the fluoropolymer particles is generally not more than 300 nm, preferably between 50 and 200 nm.

The dispersion may be additionally stabilized using non-fluorinated surfactants, such as non-ionic polyoxyalkylene, in particular polyoxyethylene surfactants, anionic non-fluorinated surfactants, cationic non-fluorinated surfactants and zwitterionic non-fluorinated surfactants. Specific examples of non-fluorinated surfactants that can be used are nonionic types such as Emulsogen EPN 207 (Clariant) and Tween 80 (ICI), anionic types such as lauryl sulfate and sodium dodecyl benzene sulfonate, cationic types such as Arquad T-50 (Akzo), Ethoquad 18–25 (Akzo) or amphoteric types such as lauryl amineoxide and cocamido propyl betaine. The non-fluorinated surfactant is preferably present in an amount of about 1 to about 25 parts by weight, preferably about 2 to about 10 parts by weight, based on 100 parts by weight of the fluorochemical composition.

Alternatively, a solution or dispersion of the fluoropolymers in an organic solvent can be used as the fluorochemical treating composition. Suitable organic solvents include alcohols such as isopropanol, methoxy propanol and t-butanol, ketones such as isobutyl methyl ketone and methyl ethylketone, ethers such as isopropylether, esters such ethylacetate, butylacetate or methoxypropanol acetate or (partially) fluorinated solvents such as HCFC-141b, HFC-134a, HFE-7100, HFE-7200 or perfluoroketones. HFE-7100, HFE-7200 and perfluoroketones are commercially available from the 3M Company, St. Paul, Minn.

The fluorochemical composition may contain further additives such as buffering agent, agents to impart fire proofing or antistatic properties, fungicidal agents, optical bleaching agents, sequestering agents, mineral salts and swelling agents to promote penetration. It is particularly preferred to include one or more auxiliary components other than the fluoropolymer and that are capable of further improving the oil- and/or water repellency properties of a fibrous substrate treated with the fluorochemical composition or that are capable of improving the soil/stain release properties of a fibrous substrate treated with the fluorochemical composition. Preferably, the auxiliary components are capable of improving the durability of the repellency properties and/or soil/stain release properties.

The auxiliary components are generally non-fluorinated organic compounds and are also called extenders hereinafter. Suitable extenders capable of improving the oil- and/or water repellency properties include for example blocked isocyanates including aromatic and aliphatic blocked isocyanates, aliphatic polyisocyanates and aromatic or aliphatic carboduimides including aromatic or aliphatic polycarbodiimides. Auxiliary components that are capable of enhancing the soil/stain release properties are generally non-fluorinated organic compounds such as for example blocked isocyanate compounds that include a polyoxyalkylene group, in particular a polyoxyethylene group. Auxiliary components that are generally capable of improving durability of the repellency properties or soil/stain release properties include non-fluorinated organic compounds that have one or more groups (or a precursor thereof) capable of reacting with the surface of the fibrous substrate. Examples thereof include compounds that have isocyanate groups or blocked isocyanates.

Method of Treatment of the Fibrous Substrates

In order to affect treatment of the fibrous substrate the fibrous substrate is contacted with the fluoropolymer dispersion of the invention. For example, the substrate can be immersed in the fluorochemical treating dispersion. The treated substrate can then be run through a padder/roller to remove excess fluorochemical composition and dried. The treated substrate may be dried at room temperature by leaving it in air or may alternatively or additionally be subjected to a heat treatment, for example, in an oven. This heat treatment is typically carried out at temperatures between about 50° C. and about 190° C. depending on the particular system or application method used. In general, a temperature of about 120° C. to 170° C., in particular of about 150° C. to about 170° C. for a period of about 20 seconds to 10 minutes, preferably 3 to 5 minutes, is suitable. Alternatively, the chemical composition can be applied by spraying the composition on the fibrous substrate.

The amount of the treating composition applied to the fibrous substrate is chosen so that a sufficiently high level of the desired properties are imparted to the substrate surface without substantially affecting the look and feel of the treated substrate. Such amount is usually such that the resulting amount of the fluoropolymer on the treated fibrous substrate will be between 0.05% and 3% by weight based on the weight of the fibrous substrate. The amount that is sufficient to impart desired properties can be determined empirically and can be increased as necessary or desired.

Fibrous substrates that can be treated with the fluorochemical composition include in particular textile. The fibrous substrate may be based on synthetic fibers, e.g. polyester, polyamide and polyacrylate fibers or natural fibers, e.g. cellulose fibers as well as mixtures thereof. The fibrous substrate may be a woven as well as a non-woven substrate.

The invention will now be further illustrated with reference to the following examples without the intention to limit the invention thereto. All parts and percentages are by weight unless stated otherwise.

EXAMPLES

Formulation and Treatment Procedure

Treatment baths were formulated containing a defined amount of the fluoropolymer treatment agent. Treatments were applied to the test substrates by padding to provide a concentration as indicated in the examples (based on fabric weight and indicated as SOF (solids on fabric)). The samples are dried and cured at a temperature of 300° F. for ten minutes. The substrate used for the evaluation of treatments of this invention was 100% cotton US-3 :cotton available from Test Fabric, USA. After heat cure, the substrates were tested for their oil repellency properties.

Test Method for Oil Repellency (OR)

The oil repellency of a substrate was measured by the American Association of Textile Chemists and Colorists (AATCC) Standard Test Method No. 118-1997, which test was based on the resistance of a treated substrate to penetration by oils of varying surface tensions after contact for 30 seconds. Treated substrates resistant only to Kaydol® mineral oil (the least penetrating of the test oils) were given a rating of 1, whereas treated substrates resistant to n-heptane (the most penetrating, lowest surface tension test liquid) were given a rating of 8. Other intermediate values were determined by use of other pure oils or mixtures of oils, as shown in the following table. A "–" sign following a value indicates subjective determination by the rater of a value intermediate between two values (i.e. 4—indicates a value between 3 and 4)

| Standard Test Liquids | |
|---|---|
| AATCC Oil Repellency Rating Number | Compositions |
| 1 | Kaydol ® |
| 2 | Kaydol ®/n-Hexadecane 65/35 |
| 3 | n-Hexadecane |
| 4 | n-Tetradecane |
| 5 | n-Dodecane |

-continued

Standard Test Liquids

| AATCC Oil Repellency Rating Number | Compositions |
|---|---|
| 6 | n-Decane |
| 7 | n-Octane |
| 8 | n-Heptane |

Glossary Table

| Descriptor | Structure and/or Chemical Description | Availability |
|---|---|---|
| Ammonium persulfate | $(NH_4)_2S_2O_8$ | Sigma-Aldrich, Milwaukee, WI |
| FLUOROLINK ™ C | Perfluoropolyether macromer functionalized with carboxylic acid groups | Ausimont, Thorofare, NJ |
| HFP | Hexafluoropropene; $CF_2=CFCF_3$ | Dupont, Wilmington, DE |
| NAFION SE10172 | Perfluorosulfonic acid/ Polytetrafluorethylene copolymer | DuPont, Wilmington, DE |
| PBS | Potassium perfluorobutanesulfonate | 3M, St Paul, MN |
| PPVE-1 | Perfluoropropyl vinyl ether; $CF_2=CFOCF_2CF_2CF_3$ | Matrix Scientific, Columbia, SC |
| PPVE-2 | Perfluoropropoxypropyl vinyl ether; $CF_2=CFOCF_2CF(CF_3)CFOCF_2CF_2CF_3$; ~90% | Can be prepared as cited in U.S. Pat. No. 3,450,684 (Darby, Ex 1) |
| VDF | Vinylidene fluoride; $CH_2=CF_2$ | Sigma-Aldrich, Milwaukee, WI |

Example 1
Preparation of PPVE-2 Homopolymer Dispersion

FLOUROLINK™ C (3.3 g) and potassium hydroxide (0.186 g) were dissolved in deionized water (90.0 g). To this solution was added NAFION™ SE10172 (0.0175 g) and PPVE-2 (50.0 g); the resulting aqueous mixture was sonicated for 60 seconds using a Branson 450 sonifier (available from VWR Scientific, Bridgeport, N.J.) to produce a coarse emulsion. The resulting coarse emulsion was then homogenized with a Gaulin 15MR homogenizer (available from APV, St. Paul, Minn.) at 8800 psi (60.67 MPa) with 3 passes to yield an emulsion with a mean droplet size of 144 nm. The ensuing fine emulsion was transferred to a 3-neck 250 mL round bottom flask, fitted with an overhead stirrer and heating mantle. A solution of deionized water (10.0 g), sodium bicarbonate ($NaHCO_3$; 0.2 g) and ammonium persulfate (0.2 g) was added to the stirred mixture. The temperature of the mixture was then elevated and maintained at 60° C. for 20 hours under a nitrogen blanket. Upon cooling to room temperature, the ensuing homopolymer dispersion (characterized using NMR; 29.1 % solids) yield was determined to be 97.9%, with a mean particle size of 62 nm as measured on the Horiba LA-910 (Horiba Instruments, Inc, Irvine, Calif.). Monomer conversion to homopolymer was 82%.

Examples 2–4 were prepared essentially according to the procedure for Example 1, with the exception that the conditions and materials specified in Table 1 were used. Resulting % solids, mean particle size and conversion to homopolymer for Examples 2–4 are also listed in Table 1.

Comparative Example C1

Comparative Example C1 was prepared essentially according to Example 1 with the exception that the resulting aqueous mixture was not pre-emulsified and duration of the reaction was 24 hours instead of 20 hours.

TABLE 1

| Ex | NAFION ™ SE10172 (g) | Temperature (° C.) | Solids (%) | Mean particle size (nm) | conversion to homo- polymer (%) |
|---|---|---|---|---|---|
| 1 | 0.0175 | 60 | 29.1 | 62 | 82 |
| 2 | — | 60 | 27.7 | 62 | 77 |
| 3 | 0.0175 | 71 | 28.4 | 79 | 80 |
| 4 | — | 71 | 15.7 | 87 | 41 |
| C1* | 0.0175 | 60 | ** | — | — |

*No pre-emulsification
**No reaction observed

Example 5

Example 5 was prepared essentially according to the procedure used for Example 1 with the exception that FLOUROLINK™ C was replaced by PBS, and the reaction was run at 71° C. for 20 hours. The homopolymer dispersion had a mean particle size of 230 nm with a conversion of 58%.

Example 6

Example 6 was prepared essentially according to the procedure used for Example 5 with the exception that the addition of NAFION™ SE10172 was omitted. The homopolymer dispersion had a mean particle size of 157 nm with a conversion of 24%.

Example 7

Example 7 was prepared essentially according to the procedure used for Example 1 with the exception that PPVE-2 was replaced with PPVE-1. The homopolymer dispersion had a mean particle size of 63 nm with a conversion of 48%

Example 8

To deionized water (335.5 g) was added NAFION SE10172 (2.38 g) followed by PPVE-2 (72.0). The ensuing mixture was homogenized using a Gaulin 15MR (available from APV, St. Paul, Minn.) at 8800 psi (60.67 MPa) for 3 passes, yielding an emulsion which had a mean droplet size of 231 nm. To an aliquot of this emulsion (341.6 g) was added a solution of deionized water (20.0 g) and ammonium persulfate (1.0 g); the resulting mixture was stirred for several minutes then vacuum charged into a 500 mL high pressure reactor fitted with a stirrer, heating mantle, thermocouple, pressure gauge and gas feed valve. After twice purging with nitrogen and evacuating, the stirrer was set to 800 rpm and the temperature of the mixture was brought to 71° C. and maintained for 6 hours.

After 6 hours a 61 wt %/39 wt % VDF/HFP gas mixture was introduced into the reactor at 150 psi (1034 kPa). The total gas feed time into the 500 mL reactor took 3.42 hours. After the gas feed was complete, the reactor content was allowed to further react for 2.5 hours. Pressure in this time period drops from 150 psi (1034 kPa) to about 20 psi (138 kPa). The 27.0% solids latex that resulted had a mean particle size of 112 nm.

Example 9

The process for Example 9 is essentially the same as Example 8 with the exception that the first stage polymerization of the PPVE-2 emulsion was allowed to react for 3 hours instead of 6 hours, and the resulting mean particle size of the latex was 82 nm (26.8% solids).

Example 10

The process for Example 10 is essentially the same as Example 8 with the exception that the first stage polymerization of the PPVE-2 emulsion was allowed to react for 0.8 hours instead of 6 hours, and the resulting mean particle size of the latex was 127 nm (26.9% solids).

Comparative Example C2

The process for Comparative Example C2 is essentially the same as Example 8 with the exception that charging of the PPVE-2 emulsion was immediately followed by introduction of the VDF/HFP gas mixture, instead of allowing 6 hours reaction time. The resulting mean particle size of the latex was 115 nm (27.7% solids).

TABLE 2

Oil repellency values for Examples 8–10 and Comparative Example C2 with varying concentrations on cotton.

| Ex | Hold Time (h) | 0.2% SOF | 0.5% SOF | 1.0% SOF |
|---|---|---|---|---|
| 8 | 6 | 1 | 3 | 5 |
| 9 | 3 | 1 | 3 | 5− |
| 10 | 0.8 | 1− | 3− | 4 |
| C2 | 0 | 0 | 2 | 3.5 |

What is claimed is:

1. A method of making a poly(perfluorovinyl ether) homopolymer dispersion comprising the steps of:
   a. pre-emulsifying an aqueous mixture of a perfluorovinyl ether in the presence of a fluorochemical emulsifier to an average emulsion droplet size of one micron or less, and
   b. polymerizing said perfluorovinyl ether in the presence of an initiator at temperature and for a time sufficient to produce particles of poly(perfluorovinyl ether).

2. The method of claim 1 wherein said perfluorovinyl ethers are of the formula:

$$CF_2=CF-R_f$$

wherein $R_f$ represents a perfluorinated organic group having a chain length of at least 2 atoms and having at least one carbon atom and at least one oxygen atom.

3. The method of claim 2 wherein said $R_f$ group is a perfluoroalkoxy group, a perfluoroether group or a perfluoropolyether group.

4. The method of claim 2 wherein said $R_f$ group is of the formula:

$$-O(R^1_fO)_n(R^2_fO)_mR^3_f$$

wherein $R^1_f$, $R^2_f$ each independently represents a linear or branched perfluoroalkylene group having 1 or 6 carbon atoms, $R^3_f$ represents a linear, branched or cyclic perfluoroalkyl group having 1 to 6 carbon atoms and n and m each independently represents an integer of 0 to 10.

5. The method of claim 4 wherein at least one of n and m is different from 0.

6. The method of claim 4 wherein m is 0, n is 1, $R^1_f$ is $-CF_2CF_2-$, $-CF_2CF(CF_3)-$ or $-CF_2CF_2CF_2-$ and $R^3_f$ represents a linear, branched or cyclic perfluoroalkyl group having 1 to 6 carbon atoms.

7. The method of claim 1 wherein the concentration of perfluorovinyl ether monomer is from 1 to 70 wt % of said emulsion.

8. The method of claim 1 wherein the concentration of perfluorovinyl ether monomer is from 20 to 40 wt. % of said emulsion.

9. The method of claim 1 wherein the concentration of said fluorinated emulsifier is from 0.1 to 4 wt % of said emulsion.

10. The method of claim 1 wherein the concentration of said initiator is from 0.01 to 2 wt % of said pre-emulsion.

11. The method of claim 1 wherein the temperature is from 40 to 80° C. and the time from 6 to 48 hours.

12. The method of claim 1 wherein the degree of conversion of said polymerization is at least 1 percent.

13. The method of claim 1 wherein said fluoropolymer comprise particles having an average size of 50 to 200 nanometers.

14. The method of claim 1 wherein said emulsifier comprises repeating units derivable from a monomer of the formula:

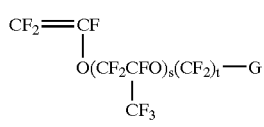

wherein a is 0, 1 or 2, and t is an integer of 2 to 4, and G is a moiety containing one or more nonionic, anionic or cationic hydrophilic groups.

15. The method of claim 1 wherein said emulsifier is selected from $$R_f^a-O-(CF_2O)_k(CF_2CF_2O)_p(CF(CF_3)CF_2O)_q-Q^1-COOM \text{ or}$$
$$MOOC-Q^1-O-(CF_2O)_k(CF_2CF_2O)_p(CF(CF_3)CF_2O)_q-Q^2-COOZ$$

wherein k, p and q each represent a value of 0 to 15, and the sum of k, p and q being such that the number average molecular weight is at least 200 g/mol, $R_f^a$ represents a perfluoroalkyl group of 2 to 4 carbon atoms, M and Z each independently represent hydrogen or a cation and $Q^1$ and $Q^2$ each independently represents —$CF_2$— or —$CF(CF_3)$—.

16. The method of claim 14 further comprising an emulsifier of the formula:

wherein k, p and q each represent a value of 0 to 15, and the sum of k, p and q being such that the number average molecular weight is at least 200 g/mol, $R_f^a$ represents a perfluoroalkyl group of 2 to 4 carbon atoms, M and Z each independently represent hydrogen or a cation and $Q^1$ and $Q^2$ each independently represents —$CF_2$— or —$CF(CF_3)$.

17. The method of claim 1 wherein said initiator comprises a water-soluble initiator.

18. The method of claim 17 wherein said water-soluble initiator is present in amounts from 0.01 to 2 weight percent, based on the total weight of the monomers.

19. The method of claim 1 wherein the temperature of said polymerization step is between 50 and 80° C.

20. The method of claim 1 wherein the amount of emulsifier is from 0.01 to 15 weight percent, relative to the total weight of the monomers.

21. The method of claim 1 further comprising the step of isolating said particles of poly(perfluorovinyl ether) from said dispersion.

* * * * *

UNITED STATES PATENT AND TRADEMARK OFFICE
CERTIFICATE OF CORRECTION

PATENT NO. : 6,833,418 B2
DATED : December 21, 2004
INVENTOR(S) : Tan, Lian Soon It is certified that error appears in the above-identified patent and that said Letters Patent is hereby corrected as shown below:

Column 8,
Line 25, after "perfluoro(methyl vinyl)ether" delete "." and insert in place thereof -- , --.

Column 9,
Line 18, delete "100" and insert in place thereof -- 1000 --.

Column 13,
Line 43, delete "carboduimides" and insert in place thereof -- carbodiimides --.

Column 18,
Line 19, delete "1 or 6" and insert in place thereof -- 1 to 6 --.
Line 25, delete "$R^t_f$" and insert in place thereof -- $R^1_f$ --.
Line 57, delete "wherein a" and insert in place thereof -- wherein s --.

Signed and Sealed this

Twenty-fourth Day of May, 2005

JON W. DUDAS
*Director of the United States Patent and Trademark Office*